UNITED STATES PATENT OFFICE.

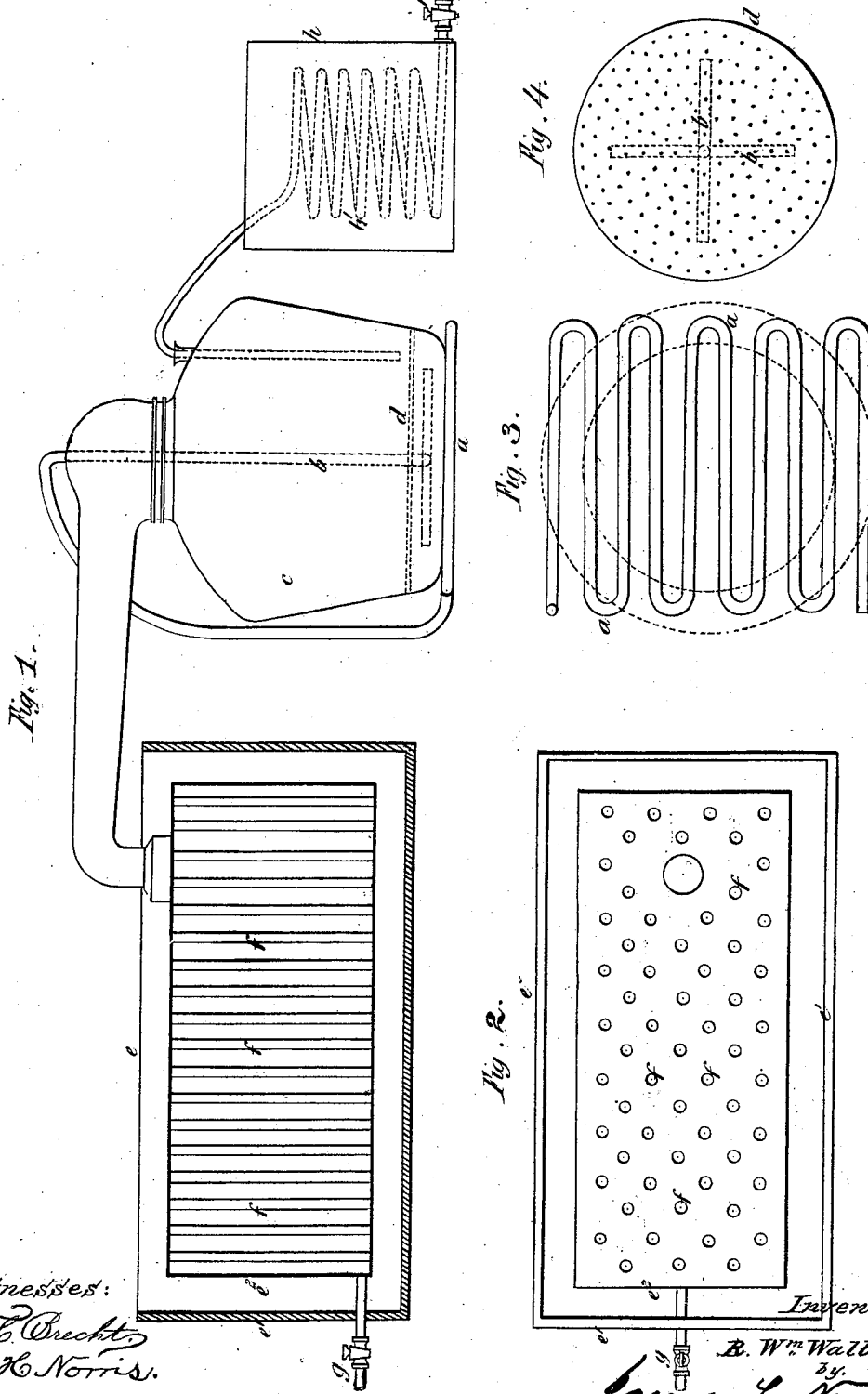

ROGER WILLIAM WALLACE, OF LONDON, ENGLAND.

IMPROVEMENT IN APPARATUS FOR PURIFYING AND CONDENSING SULPHURIC ACID.

Specification forming part of Letters Patent No. 196,957, dated November 6, 1877; application filed August 7, 1877; patented in Great Britain, May 30, 1876.

*To all whom it may concern:*

Be it known that I, ROGER WILLIAM WALLACE, of London, England, manufacturing chemist, have invented new and useful Improvements in Apparatus for Purifying Sulphuric Acid, and in the concentration and refining of sulphuric and other acids, which improvements are fully set forth in the following specification, reference being had to the accompanying drawing, in which—

Figure 1 is an elevation, partly in section, of apparatus comprising a closed vessel, a condenser, and cooler, hereinafter described. Fig. 2 is a plan or top view of the said condenser. Fig. 3 is a coil of tubing. Fig. 4 is a perforated bottom for the said close vessel.

Like letters indicate the same parts throughout the drawing.

This invention relates to the manufacture of and to the concentration and purification of sulphuric and other acids. It permits the use of retorts of cheap materials of any desired size in such manufacture.

My invention consists in a novel apparatus for the concentration and refining of sulphuric acid, and the concentration and refining of other acids.

The said apparatus is illustrated in Figs. 1, 2, 3, and 4.

In using this apparatus I heat air to a temperature of about 700° Fahrenheit in an iron coil, $a$, and distribute it by means of pipes $b$, made of platina, porcelain, or other material, into a closed vessel, $c$, made of glass, glazed plumbago, platina, or other material. The hot air is introduced into the sulphuric acid in this chamber by means of a pipe and a perforated false bottom, $d$, and the required draft through the apparatus is produced by an air-pump or aspirator, or other suitable means, connected with said apparatus by any of the ordinary methods of connecting blast or air supplying machines with retorts and similar implements used in chemical manufactures.

Water has hitherto been used as the medium for condensing the waste fumes, and for cooling the sulphuric acid after it leaves the still, but instead of water I use sulphuric acid for these purposes.

The condenser $e$, Figs. 1 and 2, is constructed with an outer casing, $e^1$, and an inner box or casing, $e^2$, of lead or other suitable material. Pipes $f$ extend vertically through the said inner casing, and the latter is connected with the neck of the still or closed vessel $c$. The sulphuric acid used as the condensing medium flows through the said pipes, and the air and gas from the closed vessel surround the same.

$g$ is a cock for drawing off the condensed liquid from the casing $e^2$. $h$ is a cooler or vessel for cooling the liquid acid from the vessel $c$. $h^1$ is a coil of pipe, and $h^2$ is a cock on the same.

The bottom of the retort or closed vessel $c$ may be heated by the flame which heats the aforesaid iron coils, and the latter may serve as a support for the said retort. Therefore the acid will be heated externally by the flame and internally by the hot air. The weak-acid fumes are condensed and pumped to the top of the chamber used for the manufacture of sulphuric acid, and by means of an injector the condensed weak acid is distributed in the said chamber in the form of spray.

I thus effect a saving of steam in the sulphuric-acid chambers, and economize the fuel used for concentration by the use of the weak acid instead of water or steam.

I claim as my invention—

1. The combination of the still $c$ and pipe $b$, leading through and below the false perforated bottom $d$ of said still, and connected to an air-heater, with condenser $e$, consisting of a chamber surrounded by a jacket, and traversed by pipes $f$, communicating with the space between the chamber and said jacket, substantially as described.

2. The combination of the still $c$, having the perforated false bottom $d$, with pipe $b$, leading into said still, and below said perforated bottom, from a suitable air-heating apparatus, substantially as and for the purpose set forth.

3. The still $c$, having a pipe-connection with the coil $h^1$ arranged in the cooling-tank $h$, in combination with the condenser $e$, substantially as and for the purpose set forth.

4. The condenser $e$, consisting of a jacketed chamber traversed by pipes $f$, connecting with its jacket, said pipes being filled with sulphuric acid, substantially as and for the purpose set forth.

ROGER WILLIAM WALLACE.

Witnesses:
 WILMER M. HARRIS,
 JOHN DEAN,
 Both of No. 17 Gracechurch Street, London.